United States Patent
Okamura et al.

(10) Patent No.: US 9,938,851 B2
(45) Date of Patent: Apr. 10, 2018

(54) GOVERNING VALVE DRIVE MECHANISM AND STEAM TURBINE

(71) Applicant: MITSUBISHI HEAVY INDUSTRIES COMPRESSOR CORPORATION, Tokyo (JP)

(72) Inventors: Tomoaki Okamura, Hiroshima (JP); Makoto Katagake, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 220 days.

(21) Appl. No.: 14/899,945

(22) PCT Filed: May 23, 2014

(86) PCT No.: PCT/JP2014/063681
§ 371 (c)(1),
(2) Date: Dec. 18, 2015

(87) PCT Pub. No.: WO2015/029513
PCT Pub. Date: Mar. 5, 2015

(65) Prior Publication Data
US 2016/0160691 A1 Jun. 9, 2016

(30) Foreign Application Priority Data
Aug. 30, 2013 (JP) .................................. 2013-179822

(51) Int. Cl.
*F01D 17/14* (2006.01)
*F01K 5/02* (2006.01)
(Continued)

(52) U.S. Cl.
CPC .......... *F01D 17/145* (2013.01); *F01D 17/24* (2013.01); *F01K 5/02* (2013.01); *F01K 13/02* (2013.01);
(Continued)

(58) Field of Classification Search
CPC ........ F01D 17/145; F01D 19/02; F01D 13/02; F16K 31/047; F05D 2270/66
See application file for complete search history.

(56) References Cited

U.S. PATENT DOCUMENTS 4,847,039 A * 7/1989 Kendall .................. F01D 17/18
376/297
5,333,989 A * 8/1994 Missana .................. F01D 17/10
251/129.04
(Continued)

FOREIGN PATENT DOCUMENTS

CN 1145482 A 3/1997
CN 1481480 A 3/2004
(Continued)

OTHER PUBLICATIONS

International Search Report dated Jul. 1, 2014 in corresponding PCT/JP2014/063681.
(Continued)

*Primary Examiner* — Ninh H Nguyen
(74) *Attorney, Agent, or Firm* — Birch, Stewart, Kolasch & Birch, LLP

(57) ABSTRACT

This governing valve drive mechanism is a governing valve drive mechanism (15) that opens/closes a steam flow path (12) with a valve body (13) in order to regulate the flow rate of steam in a steam turbine (10), and is equipped with: a valve body advancing/retreating mechanism (14) for advancing and retreating the valve body (13) toward and from the steam flow path (12); multiple sets of electric actuators (23A, 23B) each having a rotational drive source (26) and a conversion section (30) for converting rotation of the rotational drive source (26) into a linear motion; connection switching sections (38) by which the electric actuators (23A, 23B) can be individually connected to the valve body advancing/retreating mechanism (14); and a control unit (17) for controlling operations of the rotational drive sources (26) and connection switching sections (38).

10 Claims, 14 Drawing Sheets

(51) Int. Cl.
*F01D 17/24* (2006.01)
*F01K 13/02* (2006.01)
*F16K 31/04* (2006.01)

(52) U.S. Cl.
CPC ........ *F16K 31/047* (2013.01); *F05D 2220/31* (2013.01); *F05D 2230/72* (2013.01); *F05D 2260/57* (2013.01); *F05D 2270/46* (2013.01); *F05D 2270/62* (2013.01)

(56) References Cited

U.S. PATENT DOCUMENTS

| | | | | |
|---|---|---|---|---|
| 5,823,742 | A | * | 10/1998 | Giddings ................ F01D 17/18 137/883 |
| 2004/0076509 | A1 | | 4/2004 | Steinborn |
| 2007/0075285 | A1 | | 4/2007 | Lovejoy |
| 2011/0103930 | A1 | * | 5/2011 | Tecza .................... F01D 17/145 415/1 |
| 2013/0333573 | A1 | | 12/2013 | Furukawa et al. |
| 2014/0234084 | A1 | | 8/2014 | Katagake |

FOREIGN PATENT DOCUMENTS

| | | |
|---|---|---|
| CN | 10223475 A | 9/2011 |
| CN | 202954856 U | 5/2013 |
| EP | 2 960 442 A1 | 12/2015 |
| JP | 61-129408 A | 6/1986 |
| JP | 61-215403 A | 9/1986 |
| JP | 8-232607 A | 9/1996 |
| JP | 2002-130420 A | 5/2002 |
| JP | 2006-233797 A | 9/2006 |
| JP | 2013-62932 A | 4/2013 |
| JP | 2013-72349 A | 4/2013 |
| WO | WO 2013/047423 A1 | 4/2013 |
| WO | WO 2014/147832 A1 | 9/2014 |

OTHER PUBLICATIONS

Written Opinion of the International Searching Authority dated Jul. 1, 2014 in corresponding PCT/JP2014/063681.
Chinese Office Action and Search Report for Chinese Application No. 201480031859.7, dated Apr. 26, 2016, with an English translation.
Extended European Search Report for European Application No. 14839099.0, dated Jun. 15, 2016.

* cited by examiner

GOVERNING VALVE DRIVE MECHANISM AND STEAM TURBINE

TECHNICAL FIELD

The present invention relates to a governing valve drive mechanism of a steam turbine which is rotationally driven by steam, and a steam turbine.

Priority is claimed on Japanese Patent Application No. 2013-179822, filed Aug. 30, 2013, the content of which is incorporated herein by reference.

BACKGROUND ART

A steam turbine is used to drive a machine or the like. The steam turbine includes a turbine main body having a rotor which is rotatably supported. The rotor is rotationally driven by supplying steam serving as a working fluid to the turbine main body. Steam supplied to the turbine main body or steam extracted from the turbine main body flows through a steam flow path of the steam turbine. A governing valve is provided in the steam flow path. A flow rate of steam supplied to the turbine main body can be regulated by regulating an opening degree of the governing valve.

The governing valve is driven by a governing valve drive mechanism. In general, a hydraulic servo mechanism is used as the governing valve drive mechanism.

Meanwhile, for example, in order to achieve space saving or the like, PTL 1 suggests a governing valve drive mechanism which includes an electric motor, and a conversion mechanism such as a ball screw which converts a rotational motion of the electric motor into a linear motion of a governing valve.

CITATION LIST

Patent Literature

[PTL 1] Japanese Unexamined Patent Application Publication No. 2013-72349

SUMMARY OF INVENTION

Technical Problem

In a configuration which opens/closes a governing valve by a conversion mechanism such as a ball screw, an opening degree of the governing valve should be minutely regulated in order to constantly maintain a rotating speed of the turbine main body. According to this, the conversion mechanism linearly moves with a minute stroke in a specific range to regulate the opening degree of the governing valve. Accordingly, insufficiency of lubricating oil (grease) may occur in a specific range of the conversion mechanism. When the lubricating oil is not sufficient, for example, an increase of friction resistance, an increase of a temperature due to the increase of friction resistance, or the like occurs in operation portions of the conversion mechanism, and failure of the conversion mechanism such as seizure may occur.

An object of the present invention is to provide a governing valve drive mechanism and a steam turbine capable of preventing failure of the governing valve drive mechanism which opens/closes a governing valve and improving reliability.

Solution to Problem

According to a first aspect of the present invention, there is provided a governing valve drive mechanism which drives a governing valve which opens/closes a steam flow path, through which steam serving as a working fluid of a steam turbine circulates, with a valve body in order to regulate a flow rate of the steam. The governing valve drive mechanism includes a valve body advancing/retreating mechanism which advances and retreats the valve body toward and from the steam flow path, and multiple sets of conversion mechanisms in which each set includes a rotational drive source and a conversion section which converts rotation of the rotational drive source into a linear motion. The governing valve drive mechanism further includes a connection switching section by which each set of the multiple sets of conversion mechanisms can be individually connected to the valve body advancing/retreating mechanism, and a control unit which controls operations of the rotational drive source and the connection switching section.

According to a second aspect of the present invention, in the first aspect, the governing valve drive mechanism may further include a measurement unit which measures at least one of a temperature, a drive current, vibration, the number of operation cycles, and the operation time of each of the conversion sections of the multiple sets of conversion mechanisms. The control unit may switch the conversion mechanisms which are connected to the valve body advancing/retreating mechanism, based on a measurement result of the measurement unit.

According to a third aspect of the present invention, in the governing valve drive mechanism according to the first or second aspect, the control unit may perform a preset operation for maintenance on the conversion mechanism, in which connection to the valve body advancing/retreating mechanism is released, using the connection switching section.

According to a fourth aspect of the present invention, in the governing valve drive mechanism according to any one of the first to third aspects, the conversion section may be a ball screw mechanism in which a ball screw and a nut are fitted to each other via multiple balls in a circumferential direction by a screw operation.

In the ball screw mechanism, a retainer may be provided between the balls adjacent to each other in the circumferential direction.

According to a fifth aspect of the present invention, a steam turbine includes a turbine main body which includes a blade which is rotatably supported, and a steam flow path which is connected to the turbine main body and through which steam circulates. The steam turbine further includes a governing valve which linearly moves and regulates opening/closing of the steam flow path, and the governing valve drive mechanism according to the first to fourth aspects which drives the governing valve.

Advantageous Effects of Invention

According to the above-described governing valve drive mechanism and steam turbine, it is possible to increase the endurance of the governing valve drive mechanism which opens/closes the governing valve by appropriately performing maintenance of the governing valve drive mechanism with respect to the conversion mechanism.

DESCRIPTION OF EMBODIMENTS

Hereinafter, a steam turbine in an embodiment of the present invention will be described with reference to the drawings.

Figure 1:
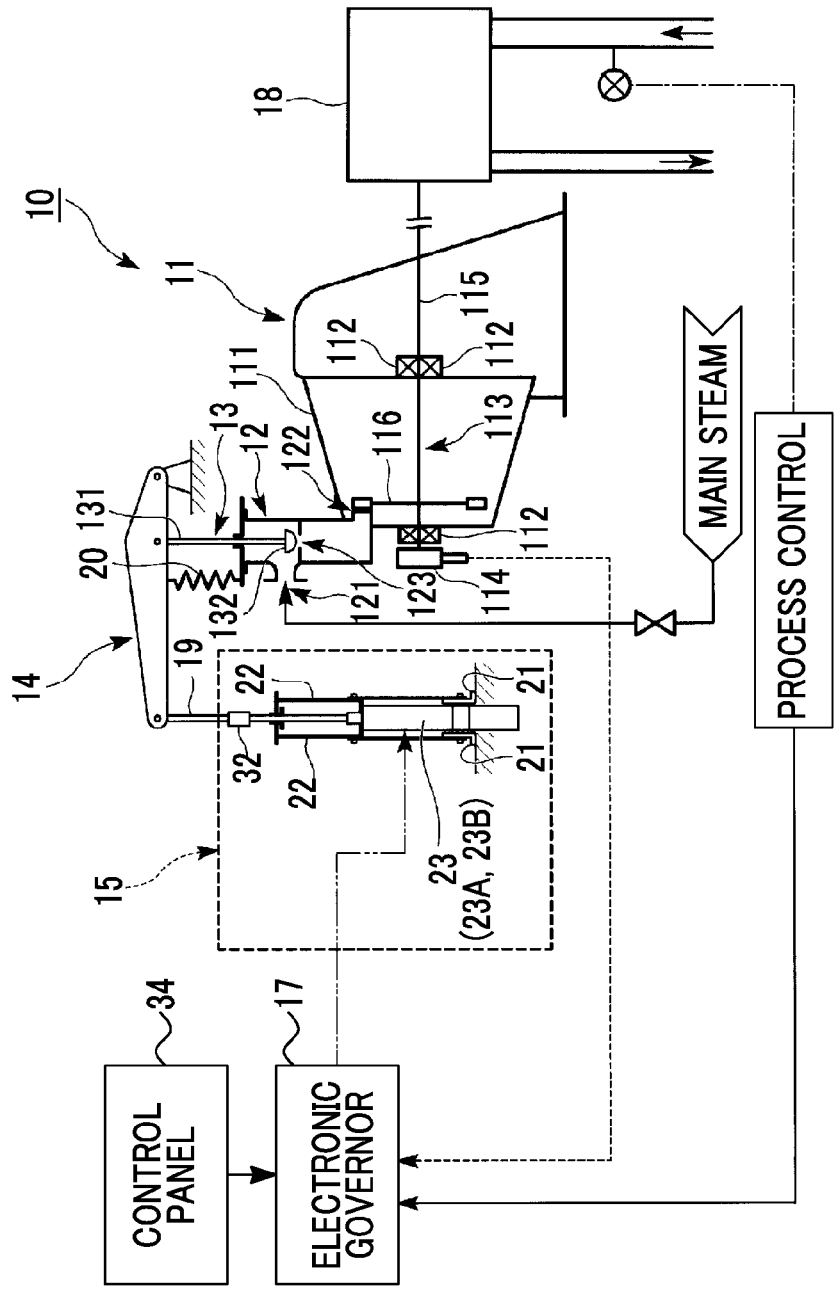
FIG. 1 is a schematic view showing a configuration of a steam turbine in an embodiment of the present invention.

FIG. 1 is a schematic view showing a configuration of a steam turbine 10 of this embodiment.

As shown in FIG. 1, the steam turbine 10 of this embodiment includes a turbine main body 11, a steam flow path 12, a governing valve 13, a lever member (valve body advancing/retreating mechanism) 14, a governing valve drive mechanism 15, a lock mechanism 16 (refer to FIGS. 5 and 6), and an electronic governor (control unit) 17 which controls the governing valve drive mechanism 15.

(Turbine Main Body)

The turbine main body 11 includes a casing 111, a bearing 112, a rotor 113, and a speed detection sensor 114. The casing 111 is formed in a tubular shape. The rotor 113 is rotatably supported by the bearing 112 and is disposed inside the casing 111. The speed detection sensor 114 detects a rotation speed of the rotor 113.

The rotor 113 includes a rotary shaft 115 and multiple blades 116. The blades 116 are fixed to the rotary shaft 115.

In the turbine main body configured as described above, the blades 116 are rotated by steam, and a compressor 18 is driven by a rotating force generated due to the rotations of the blades 116.

(Steam Flow Path)

The steam flow path 12 supplies steam serving as a working fluid to the turbine main body 11.

Steam is introduced into the steam flow path 12 from a steam introduction port 121 on a first end portion side of the steam flow path 12. A steam supply port 122 on a second end portion side of the steam flow path 12 is connected to the turbine main body 11. A throttle hole 123 in which a width of a flow path is narrowed is provided between the steam introduction port 121 and the steam supply port 122. In this embodiment, the "steam flow path" of the present invention exemplifies a flow path through which steam supplied to the turbine main body 11 circulates. However, for example, the steam flow path 12 may be a flow path through which steam extracted from the turbine main body 11 circulates.

(Regulator Valve)

The governing valve 13 regulates an amount of the steam supplied to the turbine main body 11. The governing valve 13 includes an arm member 131 and a sealing member (valve body) 132. The arm member 131 is formed in a rod shape. A first end portion of the arm member 131 is rotatably attached to an intermediate portion in a longitudinal direction of the lever member 14. The sealing member 132 is provided on a second end portion of the arm member 131 and is formed in a semicircular shape.

In the governing valve 13, according to a linear motion of the arm member 131 along the steam flow path 12, the sealing member 132 provided on the tip portion of the arm member 131 comes into contact with the throttle hole 123 of the steam flow path 12 or is separated from the throttle hole 123. Accordingly, a size of an opening between the throttle hole 123 and the sealing member 132 is changed. As a result, a flow rate of the steam supplied to the turbine main body 11 via the throttle hole 123 is changed.

In descriptions below, the sealing member 132 of the governing valve 13 being separated from the throttle hole 123 of the steam flow path 12 is referred to as lift. In addition, in a planned value of the governing valve drive mechanism 15, the maximum lift amount is defined as a lift amount of 100%, and a state where the sealing member 132 of the governing valve 13 comes into contact with the throttle hole 123 is defined as a lift amount of 0%.

(Lever Member)

The lever member 14 transmits output of the governing valve drive mechanism 15 to the governing valve 13, and advances and retreats the sealing member 132 toward and from the steam flow path 12. A base end portion in a longitudinal direction of the lever member 14 is rotatably supported. A first end portion of a lever side rod 19 is rotatably attached to a tip portion in the longitudinal direction of the lever member 14. In this embodiment, in order to connect two sets of electric actuators 23A and 23B described below (refer to FIG. 8), the first end portions of the pair of lever side rods 19 are rotatably connected to the tip portions in the longitudinal direction of the lever member 14 on both sides in a width direction, respectively. As described above, the first end portion of the arm member 131 configuring the governing valve 13 is rotatably attached to the intermediate portion in the longitudinal direction of the lever member 14. A first end portion of a pull spring 20 is attached to a tip side of the lever member 14 from a position at which the lever member 14 is attached to the arm member 131. The pull spring 20 functions as forcibly closing means for forcibly closing the governing valve 13. A second end portion of the pull spring 20 is fixed to a frame (not shown) of the steam flow path 12 or the like so as to be immovable. That is, in a state where external force is not applied to the pull spring 20, the pull spring 20 applies tensile force, by which the lever member 14 is rotated in a counterclockwise direction in FIG. 1, to the lever member 14.

(Regulator Valve Drive Mechanism)

The governing valve drive mechanism 15 drives the above-described governing valve 13. The governing valve drive mechanism 15 includes two sets of electric actuators (conversion mechanisms) 23A and 23B (refer to FIG. 8). In descriptions below, when it is not necessary to distinguish the electric actuator 23A and the electric actuator 23B, the electric actuators 23A and 23B are simply referred to as the electric actuator 23.

Each electric actuator 23 includes a pair of brackets 21 and a holding member 22. The holding member 22 is rotatably supported by the pair of brackets 21. The electric actuator 23 is held by the holding member 22.

Figure 2:
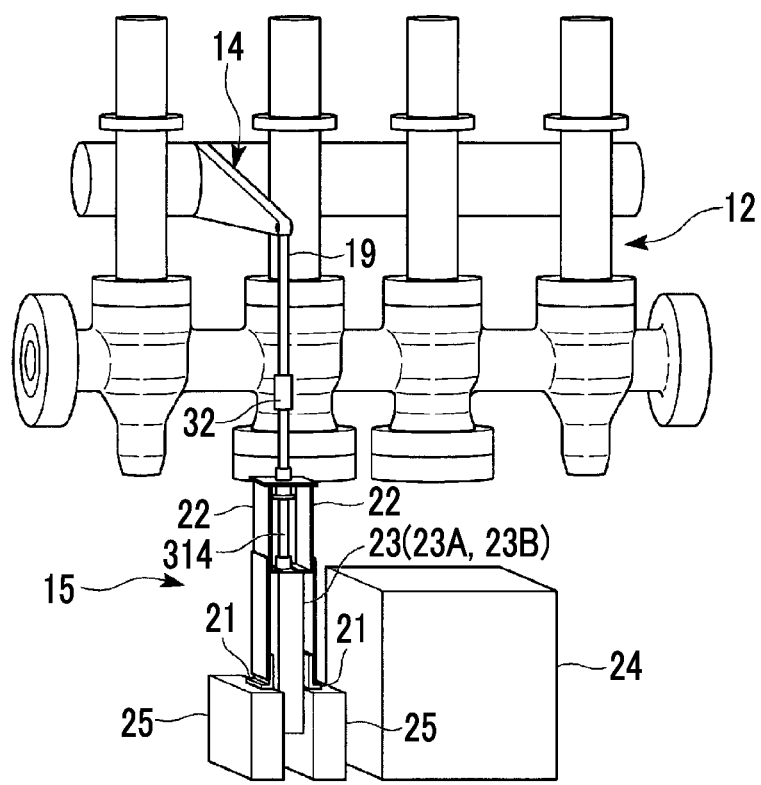
FIG. 2 is a perspective view showing the vicinity of an opening/closing drive mechanism of the steam turbine.

FIG. 2 is a perspective view showing the vicinity of the governing valve drive mechanism 15. In FIG. 2, for convenience of illustration, only one of the electric actuators 23A and 23B is shown, and the turbine main body 11 or the like is not shown.

Each of the pair of brackets 21 is formed in an L-shaped section. Each of the pair of brackets 21 is fixed to a pedestal 25. The pedestal 25 is provided so as to be close to a bearing cover 24. The bearing cover 24 accommodates the bearing 112 by which the rotary shaft 115 of the rotor 113 shown in FIG. 1 is rotatably supported.

As shown in FIGS. 1 and 2, the holding member 22 is formed in a U shape in a side view. Both end portions having a U shape of the holding member 22 are rotatably supported by the above-described pair of brackets 21.

Figure 3A:
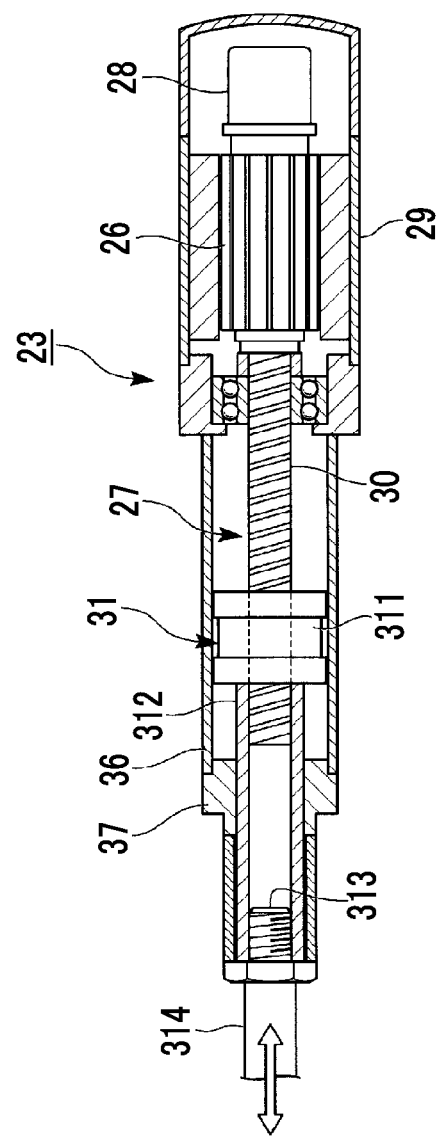
FIG. 3A is a sectional view showing an internal configuration of an electric actuator of the opening/closing drive mechanism, and shows a state before a nut moves along an axis.
Figure 3B:
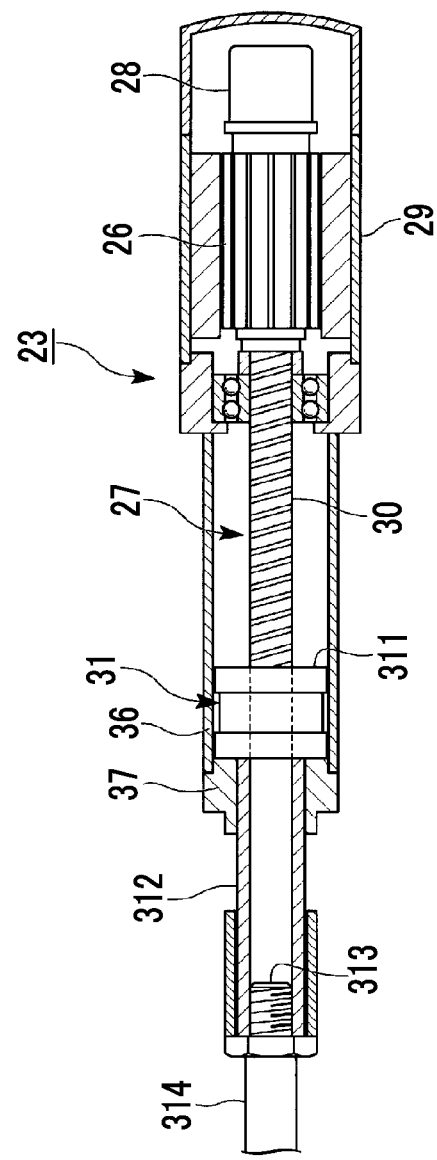
FIG. 3B is a sectional view showing the internal configuration of the electric actuator of the opening/closing drive mechanism, and shows a state after the nut moves along the axis.

FIGS. 3A and 3B are sectional views showing the internal configuration of the electric actuator 23.

As shown in FIGS. 3A and 3B, the electric actuator 23 includes a ball screw mechanism 27 and a brake 28.

The ball screw mechanism 27 converts a rotational motion of an electric motor (rotational drive source) 26 into a linear motion of the lever side rod 19. The ball screw mechanism 27 includes the electric motor 26, a ball screw (conversion section) 30, and a piston unit 31.

Power is supplied to the electric motor 26, and the electric motor 26 is rotated. The electric motor 26 is accommodated in a motor accommodation section 29. The motor accommodation section 29 is provided on a base end portion of the electric actuator 23, and an inner portion of the motor accommodation section 29 is sealed. Accordingly, the electric motor 26 has an explosion-proof structure which is isolated from oil existing in the vicinity of the electric motor 26.

The ball screw 30 is a long screw member, and male screw grooves are formed on the outer circumferential surface of the ball screw. The base end portion of the ball screw 30 is connected to a drive shaft of the electric motor 26. The ball screw 30 is rotationally driven according to the rotation of the electric motor 26.

The piston unit 31 moves forward and backward according to the rotation of the ball screw 30. The piston unit 31 reciprocates along the ball screw 30. The piston unit 31 includes a nut 311, a piston rod 312, and a rod end connector 313, and an actuator side rod 314.

The nut 311 is annularly formed so as to be fitted to the ball screw 30 by a screw operation. Female screw grooves are formed on the inner circumferential surface of the nut 311.

The piston rod 312 is formed in a tubular shape which covers the outer side of the ball screw 30. The piston rod 312 is fixed to a first end surface of the nut 311.

The rod end connector 313 is mounted so as to be fitted to the tip portion of the piston rod 312. Female screws are formed on the inner circumferential surface on the tip side of the rod end connector 313.

The actuator side rod 314 extends in a direction in which the piston rod 312 extends. Male screws are formed on a first end portion in a longitudinal direction of the actuator side rod 314. The male screws of the actuator side rod 314 engage with the female screws of the rod end connector 313, and are fixed to the rod end connector 313.

That is, in the piston unit 31, when the ball screw 30 is rotated around the axis, as shown in FIG. 3B, the nut 311 fitted to the ball screw 30 by a screw operation moves in a direction corresponding to the rotation direction of the ball screw 30 along the axis. According to the movement of the nut 311, the piston rod 312, the rod end connector 313, and the actuator side rod 314 fixed to the nut 311 also move along the axis of the ball screw 30 along with the nut 311.

Figure 4:
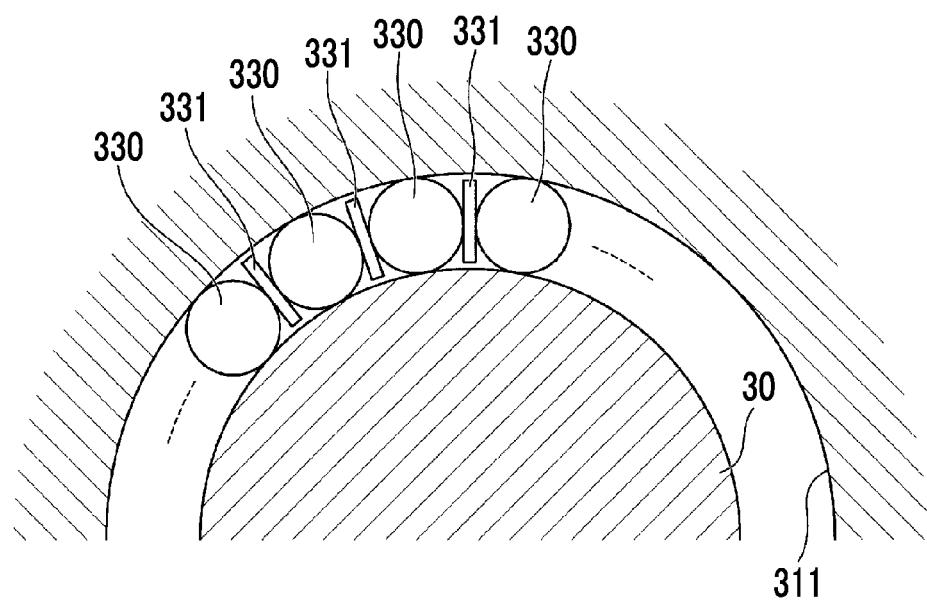
FIG. 4 is a sectional view showing a ball screw and a nut of a ball screw mechanism of the opening/closing drive mechanism.

FIG. 4 is a sectional view showing the ball screw 30 and the nut 311 of the ball screw mechanism 27.

As shown in FIG. 4, balls 330 are disposed over a portion between screw grooves of the ball screw 30 and the screw grooves of the nut 311. Multiple balls 330 are disposed in the circumferential direction. The ball screw 30 and the nut 311 are fitted to each other via the balls 330 by a screw operation.

The ball screw mechanism 27 includes a retainer 331 between the balls 330 and 330 adjacent to each other in the circumferential direction. The retainer 331 decreases friction between the balls 330 and 330 adjacent to each other in the circumferential direction and prevents heat generation during an operation.

As shown in FIGS. 3A and 3B, the electric actuator includes the brake 28 at a position opposite to the ball screw 30 in a state where the electric motor 26 is interposed therebetween. The brake 28 is configured of an electromagnetic disk brake. The brake 28 is operated when supply of power is interrupted, and brakes the rotation of the electric motor 26.

An operation of the brake 28 is controlled by the electronic governor 17 (refer to FIG. 1). When a circumferential speed of the ball screw 30 increases so as to exceed a threshold value, the electronic governor 17 operates the brake 28. That is, the rotation of the electric motor 26 is braked by operating the brake 28.

The piston unit 31 is covered by a piston casing 36. The piston casing 36 includes a piston cap 37, which seals the piston casing 36 and guides the piston rod 312, on an upper end of the piston casing 36 (left ends in FIGS. 3A and 3B).

Figure 5:
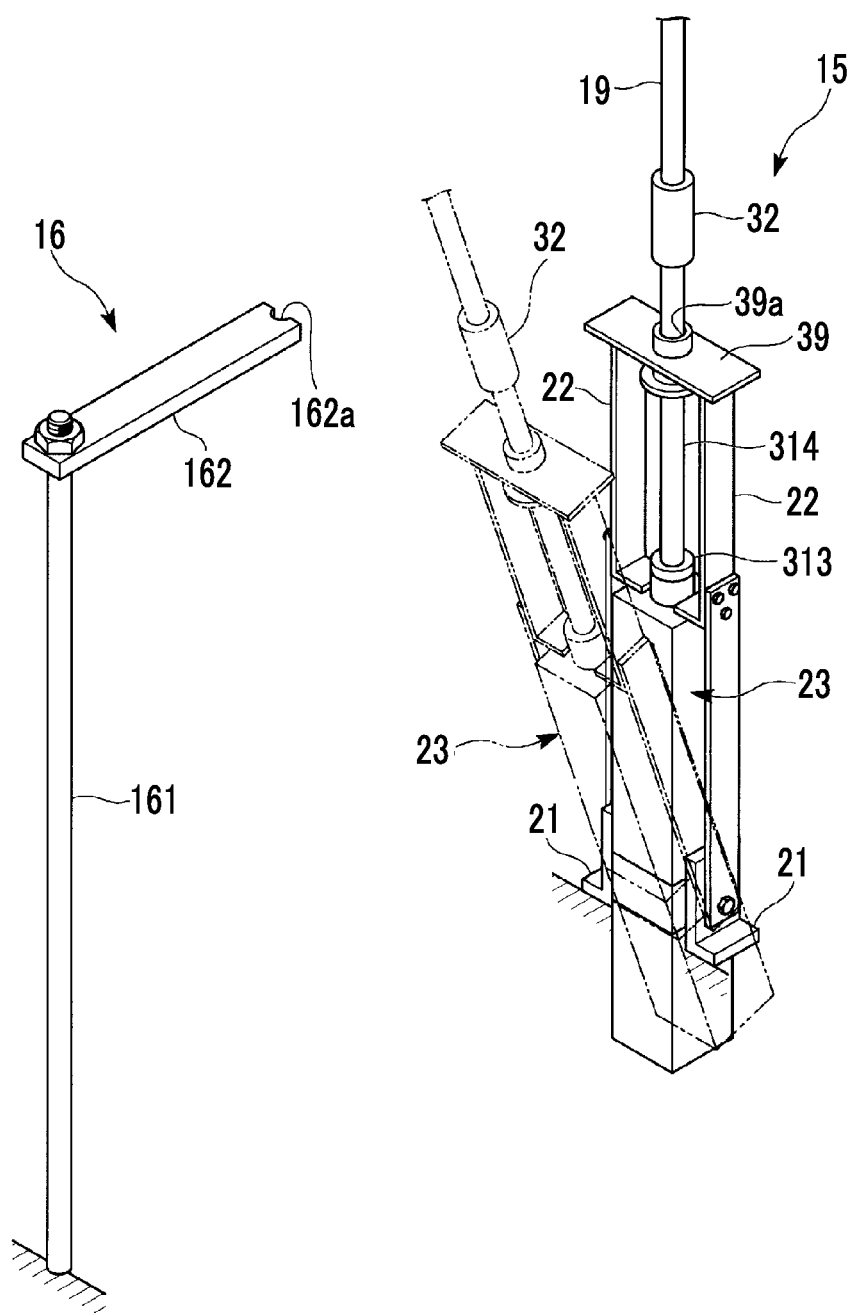
FIG. 5 is a perspective view showing the vicinity of the electric actuator.

FIG. 5 is a perspective view showing the vicinity of the electric actuator 23.

As shown in FIG. 5, the electric actuator 23 is fixed to the holding member 22.

The actuator side rod 314 is inserted into a through-hole 39a of a guide plate 39 which is provided on an upper end portion of the holding member 22. The actuator side rod 314 is connected to the lever side rod 19 via a coupling mechanism 32 described below.

As shown by two-dot chain lines in FIG. 5, the electric actuator 23 installed as described above can be rotated with a location, at which the holding member 22 is supported by the bracket 21, as a supporting point.

(Lock Mechanism)

Figure 6:
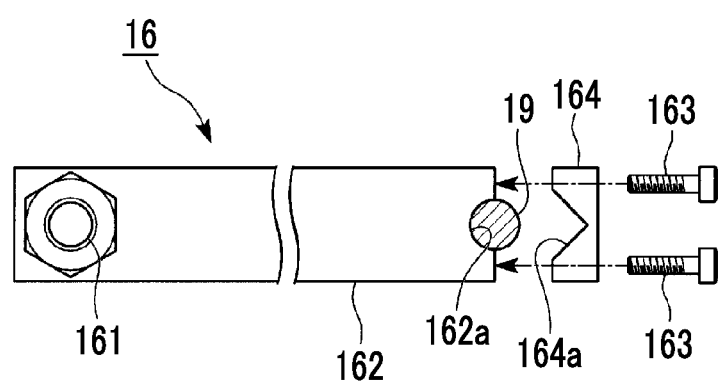
FIG. 6 is a plan view showing a configuration of a lock mechanism of the opening/closing drive mechanism.

FIG. 6 is a schematic plan view showing a configuration of the lock mechanism 16.

The lock mechanism 16 locks the governing valve 13 so as to be immovable.

As shown in FIGS. 5 and 6, the lock mechanism 16 includes a support rod 161, a holding plate 162, and a pressing member 164.

A lower end portion of the support rod 161 is fixed to a support structure on which the above-described pedestal 25 is formed or the like, and the support rod 161 extends upward.

The holding plate 162 is fixed to an upper end portion of the support rod 161 and horizontally extends. An approximately semicircular groove 162a in a plan view is formed on a tip portion of the holding plate 162.

The lever side rod 19 is interposed between the pressing member 164 and the holding plate 162. The pressing member 164 is detachably mounted on the tip portion of the holding plate 162 via a pair of fixing bolts 163. A triangular notch 164a in a plan view is formed on a side of the pressing member 164 facing the holding plate 162.

According to the above-described lock mechanism 16, after the lever side rod 19 is fitted into the groove 162a of the holding plate 162, the pressing member 164 is fixed to the tip portion of the holding plate 162 using the fixing bolts 163. Accordingly, the lever side rod 19 is interposed between the holding plate 162 and the pressing member 164. As a result, the lever side rod 19 is locked so as to be immovable.

(Limit Switch Unit)

Figure 7:
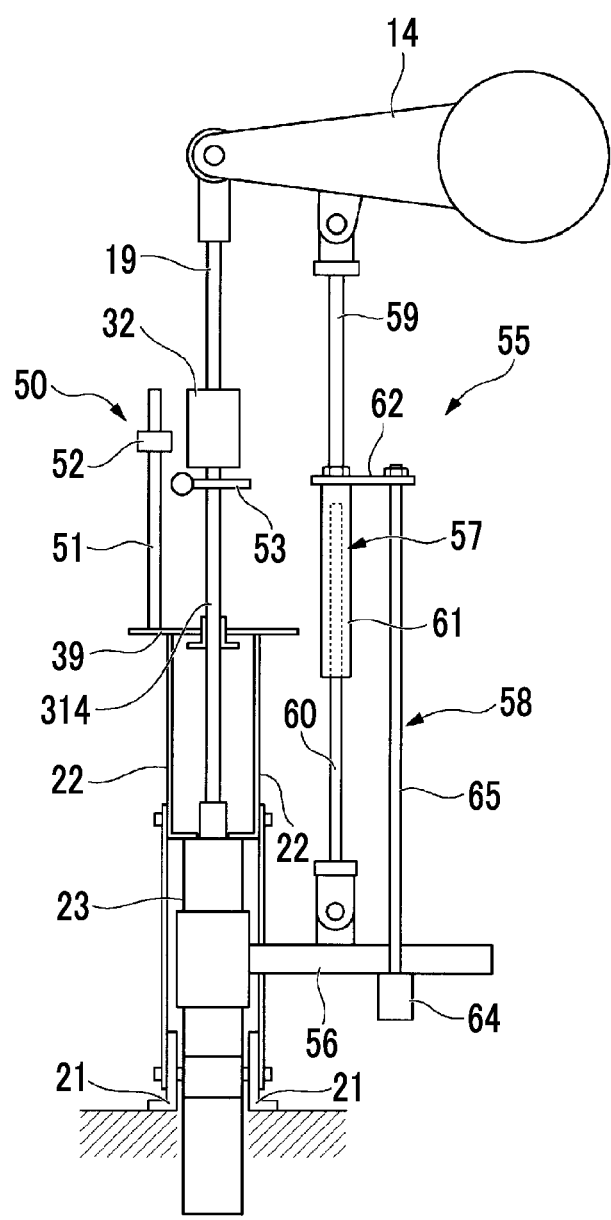
FIG. 7 is a side view showing configurations of a limit switch unit and a lift amount detection device of the opening/closing drive mechanism.

As shown in FIG. 7, a limit switch unit 50 is attached to the guide plate 39 of the holding member 22. The limit switch unit 50 functions as a limit sensor detecting that the governing valve 13 exceeds a predetermined range and is driven. The limit switch unit 50 includes a stay 51 and a limit switch 52. The stay 51 is positioned so as to be orthogonal to the guide plate 39 and extends in the longitudinal direction of the electric actuator 23. The limit switch 52 is attached to the stay 51 at a predetermined position of the stay 51. A contact bracket 53 is attached to the actuator side rod 314. The contact bracket 53 is attached to the vicinity of the connection portion between the actuator side rod 314 and the coupling mechanism 32. The contact bracket 53 is attached to a position at which the contact bracket 53 can come into contact with the limit switch 52.

When the governing valve 13 is driven by the electric actuator 23, the limit switch unit 50 is set so as to be switched on in a case where the governing valve 13 exceeds the lift amount of 100% and becomes the lift amount equal to or greater than a planned value. For example, the lift amount equal to or greater than the planned value can be the lift amount of 105%. That is, the limit switch unit 50 is turned ON when the governing valve 13 reaches the lift amount equal to greater than the planned value of the electric actuator 23. The limit switch unit 50 is connected to the electronic governor 17 (refer to FIG. 1). The electronic governor 17 communicates with the limit switch unit 50, and monitors whether or not the lift amount of the governing valve 13 is equal to or greater than the lift amount (for example, 105%) which is equal to or greater than the planned value.

(Lift Amount Detection Device)

A lift amount detection device 55 is provided on the governing valve drive mechanism 15. The lift amount detection device 55 functions as a limit sensor. The lift amount detection device 55 includes a support member 56, an extensible bar 57, and a lift sensor 58.

The support member 56 is a member which supports the extensible bar 57. The support member 56 is attached to the motor accommodation section 29 of the electric actuator 23.

The extensible bar 57 is a member which connects the support member 56 and the lever member 14. The extensible bar 57 extends so as to be parallel with the actuator side rod 314 of the electric actuator 23. A first rod 59 configuring the upper portion of the extensible bar 57 is rotatably connected to the vicinity of the tip portion in the longitudinal direction of the lever member 14. In addition, a second rod 60 configuring the lower portion of the extensible bar 57 is rotatably connected to the support member. A tubular member 61 is fixed to a lower end of the first rod 59. The tubular member 61 is formed in a tubular shape which accommodates the second rod 60 on the inner circumferential side. That is, the extensible bar 57 can be extended and contracted by allowing the second rod 60 to slide in the inner portion of the tubular member 61 fixed to the first rod 59.

The lift sensor 58 measures displacement in a vertical direction of a portion of the extensible bar 57 which vertically moves according to the rotation of the lever member 14. The lift sensor 58 is a sensor which uses a Linear Variable Differential Transformer (LVDT) which measures displacement of the tubular member 61 of the extensible bar 57. The lift sensor 58 measures the displacement tubular member 61 via a lift sensor stay 62 fixed to the upper end of the tubular member 61 of the extensible bar 57.

The lift sensor 58 includes a lift sensor body section 64, a core section (not shown), and a shaft section 65. The lift sensor body section 64 is formed in a tubular shape fixed to the support member 56. The core section is accommodated in the lift sensor body section 64. The shaft section 65 is formed in a rod shape which is connected to the core section. The shaft section 65 is disposed so as to be parallel with the extension direction of the extensible bar 57. The upper end of the shaft section 65 is fixed to the lift sensor stay 62.

The lift amount detection device 55 is connected to the electronic governor 17, and is output and regulated so as to detect the lift amount of the governing valve 13. That is, the lift amount can be detected by the electronic governor 17. For example, when the electronic governor 17 detects that the lift amount reaches a lift amount (for example, 105%) equal to or greater than the planned value by the output of the lift amount detection device 55, the electronic governor 17 operates the brake 28 and holds the opening degree of the governing valve 13. Similarly, the electronic governor 17 also monitors the limit switch unit 50, when the governing valve 13 exceeds the lift amount of 100% and the limit switch unit 50 is switched, the electronic governor 17 operates the brake 28 and holds the opening degree of the governing valve 13.

(Electronic Governor)

The electronic governor 17 controls the operation of the governing valve drive mechanism 15.

As shown in FIG. 1, a process control is performed based on a detection result of a pressure or a temperature of the compressor 18, and the control result is input to the electronic governor 17. A rotation speed of the blade 116 detected by the speed detection sensor 114 configuring the turbine main body 11 is input to the electronic governor 17. In addition, instruction from a user input from the operation panel 34 is also input to the electronic governor 17. The electronic governor 17 controls the operation of the governing valve drive mechanism 15 based on the inputs. More specifically, the electronic governor 17 controls the electric motor 26 configuring the electric actuator 23 based on the above-described inputs.

Figure 8:
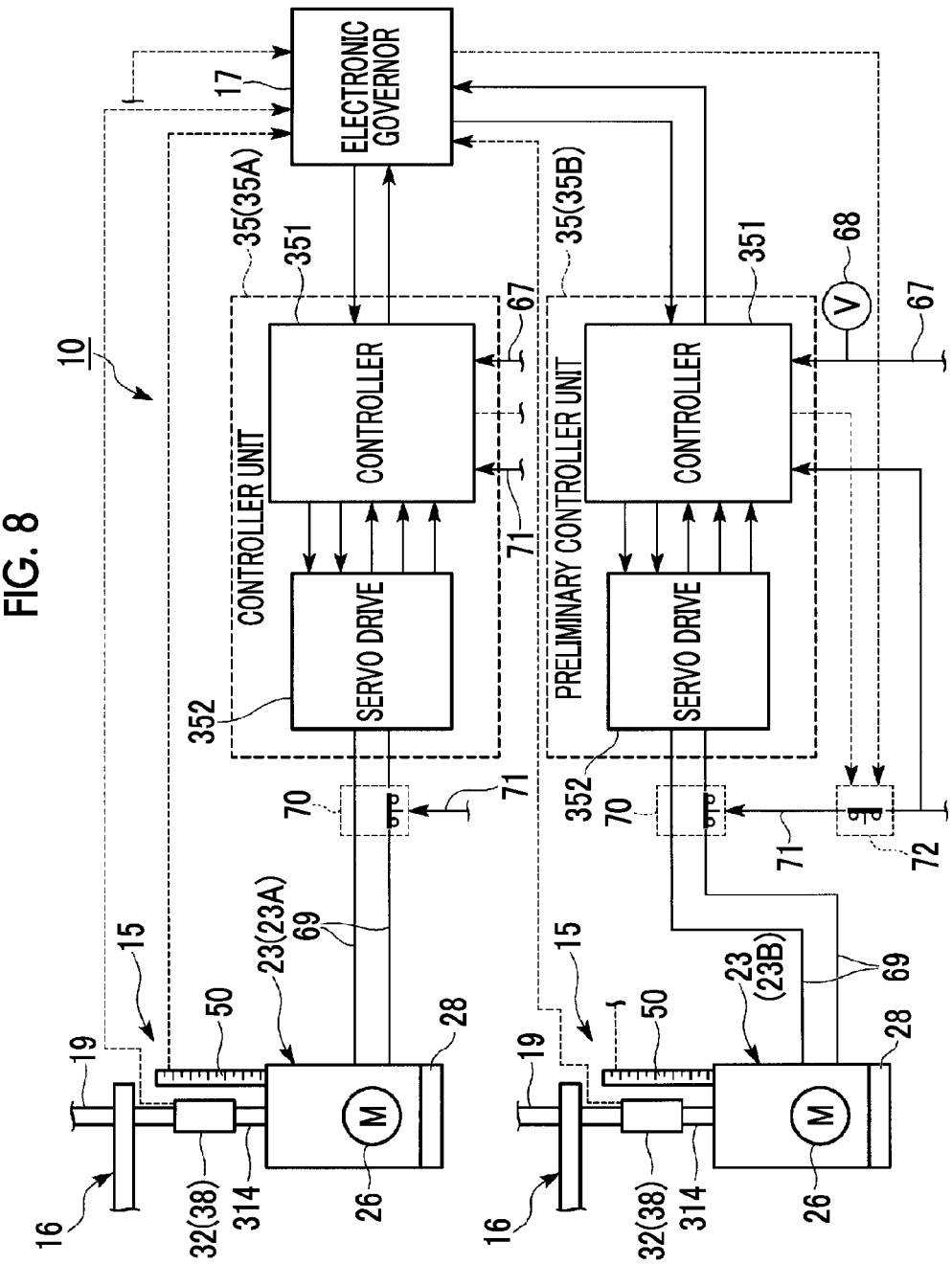
FIG. 8 is a control block diagram of an electric actuator and a connection switching section in a steam turbine of this embodiment.

FIG. 8 is a control block diagram of the electric actuator 23.

In the steam turbine 10 according to this embodiment, a controller unit 35 controls the operation of the electric actuator 23 based on the control processing performed by the electronic governor 17.

The controller unit 35 includes a controller 351 and a servo drive 352. A main power source (for example, AC 230V) is supplied to the controller unit 35 via a power source cable 67. A voltmeter 68 which measures a voltage is provided in the power source cable 67. The voltmeter is connected to the electronic governor 17, and notifies a power source voltage of the power source cable 67 to the electronic governor 17.

According to the above-described configuration, the controller 351 issues a command with respect to a rotation speed to the servo drive 352 based on the control processing of the electronic governor 17. The servo drive 352 supplies driving power to the electric motor 26 via a motor cable 69 based on the command. Meanwhile, a rotation speed or a current value detected by the electric motor 26, a temperature of each location, or the like is input the controller 351 via the servo drive 352. When abnormality in the detected value is detected, the controller 351 notifies the electronic governor 17 that serious failures or minor failures have occurred in the electric motor 26.

The control unit 35 controls the brake 28 via the servo drive 352. Auxiliary power generated from an uninterruptible power source device (not shown) can be supplied to the brake 28 via a cable 71.

A switch device 70 capable of interrupting a power supply via the motor cable 69 is provided in the motor cable 69. Auxiliary power generated from the uninterruptible power source device can be supplied to the switch device 70 via the cable 71.

The switch device 70 is closed in a state where the auxiliary power is supplied to the switch device 70, and power is supplied to the electric motor 26.

An auxiliary switch device 72 capable of interrupting auxiliary power is provided in the cable 71. The auxiliary power is also supplied to the controller 351.

(Connection Switching Section)

Figure 9:
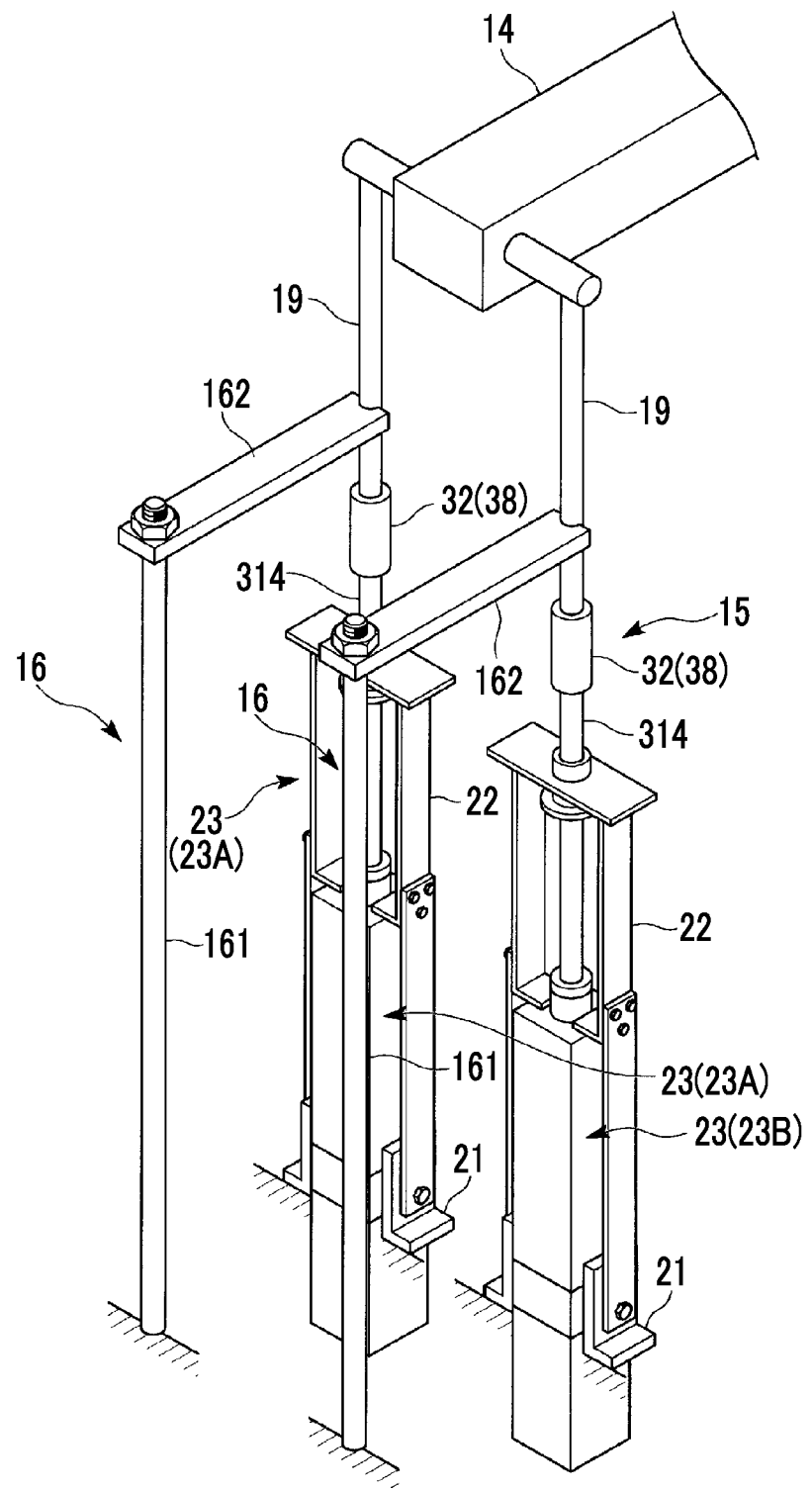
FIG. 9 is a perspective view showing configurations of two sets of electric actuators.
Figure 10A:
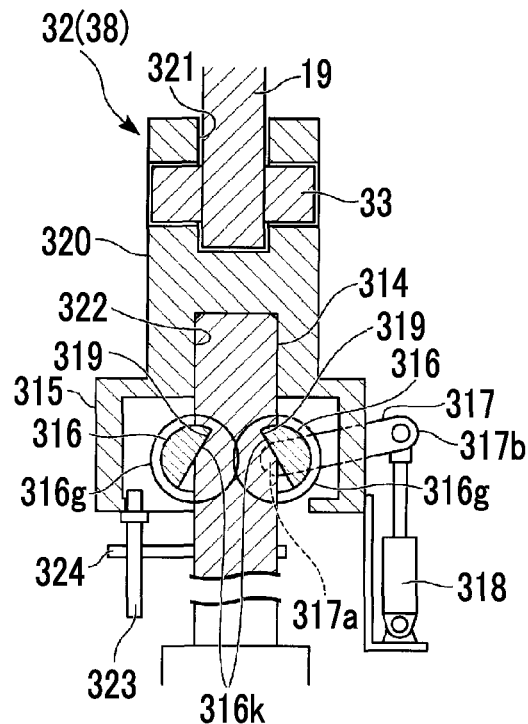
FIG. 10A is a sectional view showing a configuration and an operation of the connection switching section, and shows a state where an engagement key is inserted so as to engage with an engagement recessed portion.
Figure 10B:
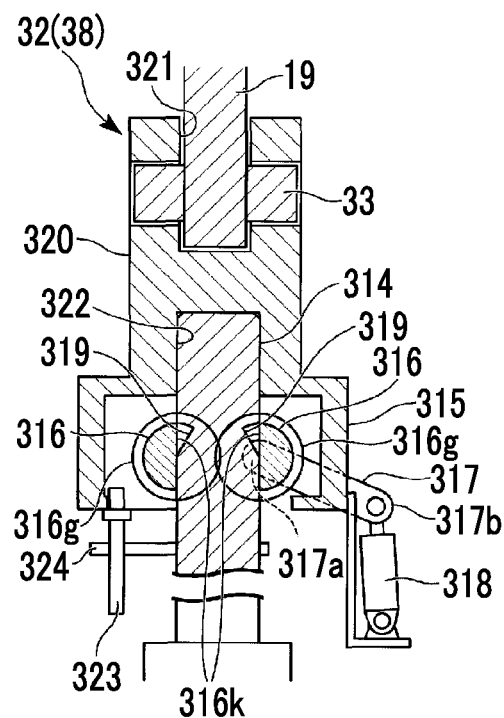
FIG. 10B is a sectional view showing the configuration and the operation of the connection switching section, and shows a state where the engagement key is extracted so as to disengage from the engagement recessed portion.
Figure 10C:
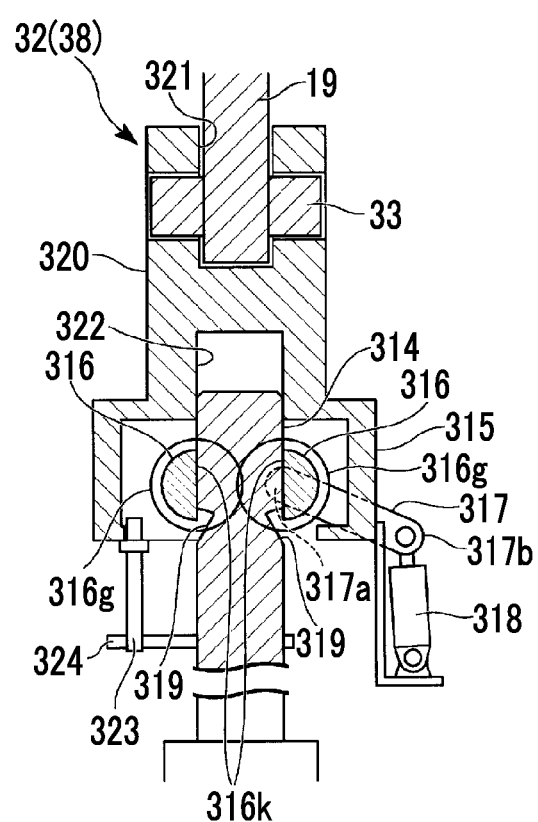
FIG. 10C is a sectional view showing the configuration and the operation of the connection switching section, and shows a state where an actuator side rod relatively moves in a center axis direction with respect to a coupling housing.

FIG. 9 is a perspective view showing a configuration in which two sets of electric actuators 23 are provided. FIG. 10A is a sectional view showing a configuration and an operation of a connection switching section, and shows a state where an engagement key is inserted so as to engage with an engagement recessed portion. FIG. 10B is a sectional view showing the configuration and the operation of the connection switching section, and shows a state where the engagement key is extracted so as to disengage from the engagement recessed portion. FIG. 10C is a sectional view showing the configuration and the operation of the connection switching section, and shows a state where an actuator side rod relatively moves in a center axis direction with respect to a coupling housing.

As shown in FIG. 9, the governing valve drive mechanism 15 includes two sets of electric actuators 23A and 23B. As shown in FIG. 8, the steam turbine 10 includes two sets of controller units 35A and 35B as means for controlling operations of the two sets of electric actuators 23A and 23B.

That is, in the steam turbine 10 of this embodiment, the governing valve drive mechanism 15 and the controller unit 35 are made redundant, respectively.

In descriptions below, when it is not necessary to distinguish the controller unit 35 into the controller unit 35A and the controller unit 35B, the controller units 35A and 35B are simply referred to as the controller unit 35.

The governing valve drive mechanism 15 includes connection switching sections 38 which can connect the electric actuators 23A and 23B to the lever members 14 individually. The pair of lever side rods 19 and 19 is provided on both sides in the width direction of the tip portion in the longitudinal direction of the lever member 14. Each of the two sets of electric actuators 23A and 23B are connected to each of the pair of lever side rods 19 and 19 via the coupling mechanism 32. The coupling mechanism 32 is provided in each of the electric actuators 23A and 23B. By operating the coupling mechanism 32 according to the control of the electronic governor 17, the connection switching section 38 connects each of the electric actuators 23A and 23B to the lever member 14 individually.

As shown in FIGS. 10A to 10C, a lever side rod insertion hole 321 is formed in each coupling mechanism 32. The lever side rod insertion hole 321 is formed on a first end surface of a coupling housing 320. An actuator side rod insertion hole 322 is formed in each coupling mechanism 32. The actuator side rod insertion hole 322 is formed on a second end surface of the coupling housing 320.

The lever side rod 19 is inserted into the lever side rod insertion hole 321 of the coupling housing 320. The coupling housing 320 and the lever side rod 19 are connected to each other by a pin 33. The pin 33 penetrates the coupling housing 320 and the lever side rod 19.

The tip portion of the actuator side rod 314 is removably inserted into the actuator side rod insertion hole 322 of the coupling housing 320.

A tubular hood section 315 is formed on the second end surface of the coupling housing 320. In the hood section 315, each of a pair of engagement key shafts 316 and 316 is rotatably provided around the central axis. Each of the engagement key shafts 316 and 316 is formed in a columnar shape orthogonal to the central axis of the actuator side rod 314. The engagement key shafts 316 and 316 are provided on both sides of the actuator side rod 314 in a state where the actuator side rod 314 is interposed therebetween. The engagement key shafts 316 and 316 include gears 316g and 316g, which engage with each other, at positions at which the gears do not interfere with the actuator side rod 314. A first end portion 317a of a drive arm 317 is joined to one gear 316g of the gears 316g and 316g. An oscillating mechanism 318 is provided on a second end portion 317b of the drive arm 317. The oscillating mechanism 318 oscillates the drive arm 317 about the first end portion 317a side. For example, the oscillating mechanism 318 can be an air cylinder, an electric actuator, or the like. The drive arm 317 is oscillated by extracting and contracting the oscillating mechanism 318. Accordingly, the engagement key shafts 316 and 316 are rotated in directions opposite to each other via the gears 316g and 316g engaging with each other.

In the engagement key shafts 316 and 316, for example, engagement keys 316k and 316k having half moon-shaped sections are integrally formed with the engagement key shafts 316 and 316 at positions facing the actuator side rod 314. Meanwhile, engagement recessed portions 319 for allowing the actuator side rod 314 and the coupling housing 320 to engage with each other are formed on the outer circumferential surface of the actuator side rod 314. The engagement key shafts 316 and 316 rotate around the axes by the oscillating mechanism 318, and accordingly, the engagement keys 316k and 316k advance and retract toward and from the engagement recessed portions 319.

Therefore, as shown in FIG. 10A, in the state where the engagement keys 316k and 316k are inserted so as to engage with the engagement recessed portions 319 and 319, the actuator side rod 314 is connected to the coupling housing 320. In addition, as shown in FIGS. 10B and 10C, the engagement keys 316k and 316k are disengaged so as to be extracted from the engagement recessed portions 319 and 319. Accordingly, the actuator side rod 314 can relatively move with respect to the coupling housing 320 in the center axis direction of the actuator side rod 314.

A sensor rod 323 is provided in the coupling housing 320. The sensor rod 323 extends along the actuator side rod 314. A detection element 324 which can move along the sensor rod 323 is attached to the actuator side rod 314. The sensor rod 323 detects a position of the detection element 324, and outputs the detected signals to the electronic governor 17. Accordingly, the electronic governor 17 detects the position of the actuator side rod 314. According to the detected results, the electronic governor 17 detects whether or not the engagement keys 316k and 316k engage with the engagement recessed portions 319 and 319 and the actuator side rod 314 is connected to the coupling housing 320.

In order to control the coupling mechanism 32 by the electronic governor 17, the ball screw mechanism 27 of each of the multiple sets of electric actuators 23A and 23B includes sensors or counters (not shown) as a measurement unit. The measurement unit measures at least one of a temperature (particularly, temperatures of the ball screw 30 and the nut 311), a drive current of the ball screw mechanism 27, vibration, the number of operation cycles after a previous maintenance operation is performed, and an operation time after a previous maintenance operation is performed.

Next, an operation of the steam turbine 10 in this embodiment will be described.

Figure 11:
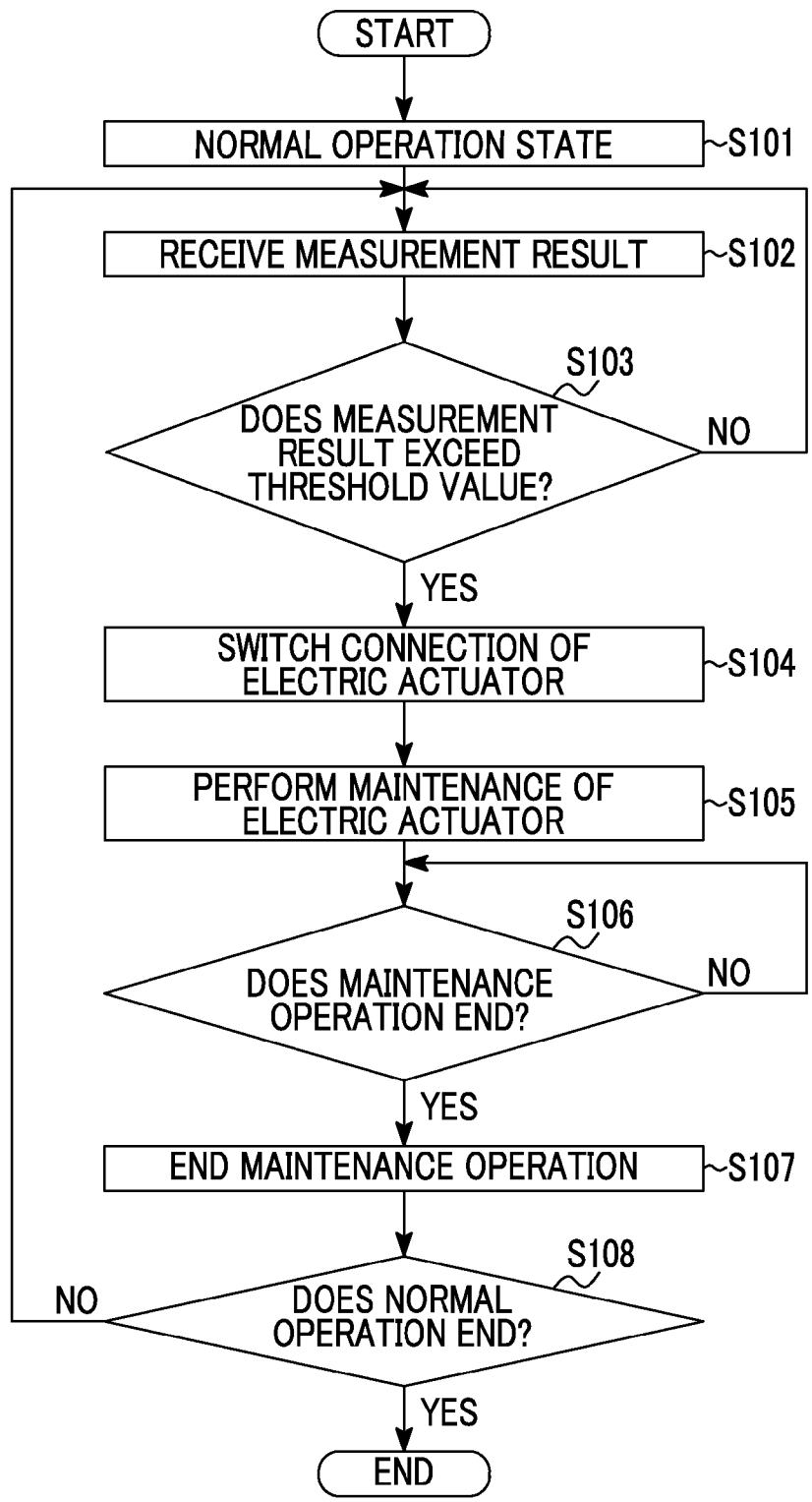
FIG. 11 is a diagram showing a flow of a control of a governing valve drive mechanism when the steam turbine is operated.

FIG. 11 is a diagram showing a flow of a control of a governing valve drive mechanism 15 when the steam turbine 10 is operated.

As shown in FIG. 11, in a normal operation state, in the steam turbine 10, the operation of the governing valve drive mechanism 15 is controlled by the electronic governor 17 and the controller unit 35 and the governing valve 13 is driven (Step S101). The electronic governor 17 controls the governing valve drive mechanism 15 based on a pressure or a temperature of the compressor 18, a rotation speed of the blade 116, instruction from a user, or the like.

In this normal operation state, in one (for example, the electric actuator 23A) of the electric actuators 23A and 23B, the actuator side rod 314 is connected to the coupling housing 320. Accordingly, the governing valve 13 is driven by the electric actuator 23A.

Figure 12:
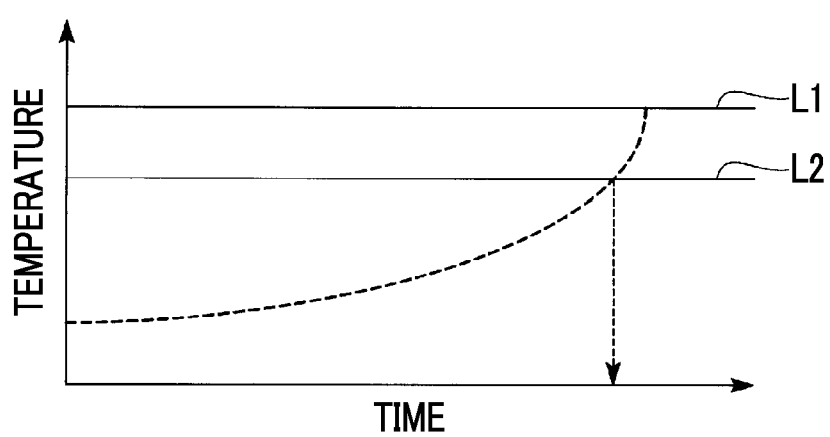
FIG. 12 shows an example of a change of temperature with the elapse of time in the electric actuator in use.

FIG. 12 shows an example of a change of temperature with the elapse of time in the electric actuator 23A in use.

In the normal operation state, when the electric actuator 23A repeats a stroke operation to drive the governing valve 13, an amount of lubricating oil of the ball screw mechanism 27 decreases within a specific range. Accordingly, operation resistance of the ball screw mechanism 27 increases. As a result, as shown in FIG. 12, the temperature of the ball screw mechanism 27 of the electric actuator 23A increases with the elapse of time. Similarly, if the operation resistance of the ball screw mechanism 27 increases, a drive current value and vibration of the electric actuator 23A also increases. In the electric actuator 23A in use, the number of operation cycles and the operation time of the electric actuator 23A after a previous maintenance operation is performed increase with the lapse of time.

Accordingly, with respect to each of measurement parameters such as a temperature, a drive current, vibration, the number of operation cycles, and an operation time, an upper limit L1 which indicates an upper limit in use, and a threshold value L2 which is smaller than the upper limit L1 are set.

The electronic governor 17 receives measurement results obtained from sensors or counters (not shown) every set time (Step S102). The electronic governor 17 monitors the received measurement results, and determines whether or not the measurement results of the measurement parameters such as the temperature, the drive current, vibration, the number of operation cycles, and the operating time of the electric actuator 23A in use obtained from sensors or counters exceed the predetermined threshold value L2 (Step S103). When some measurement parameters exceed the threshold value L2 (Yes in Step S103), the electronic governor 17 switches the electric actuator 23 connected to the lever member 14 (Step S104).

That is, first, in the unused electric actuator 23B, the engagement keys 316k and 316k engage with the engagement recessed portions 319 and 319 by operating the oscillating mechanism 318 of the coupling mechanism 32. Accordingly, the actuator side rod 314 is connected to the coupling housing 320. In this state, the electric actuator 23B is operated in synchronization with the electric actuator 23A in use. Accordingly, the governing valve 13 is continuously driven.

Sequentially, in the electric actuator 23A which has been used until that time, the engagement keys 316k and 316k are separated from the engagement recessed portions 319 and 319 by operating the oscillating mechanism 318 of the coupling mechanism 32. Accordingly, connection between the actuator side rod 314 and the coupling housing 320 is released.

The operation of switching the electric actuator 23 connected to the lever member 14 when the measurement results such as the temperature, the drive current, vibration, the number of operation cycles, and the operating time of the electric actuator 23A in use exceed the predetermined threshold value L2 may be automatically performed based on a preset computer program. For example, this operation may be performed after an operator checks the operation state (load, rotating speed, stability of axial vibration, and a state where an alarm is not generated) of each portion of the steam turbine 10.

With respect to the electric actuator 23A in which the connection to the coupling housing 320 is released, a predetermined grease-up operation (a maintenance operation) of spreading lubricating oil to a portion between the ball screw 30 and the nut 311 is automatically performed by the control of the electronic governor 17 (Step S105). Here, the electric actuator 23A in which the connection to the coupling housing 320 is released indicates the electric actuator 23A which has been used until that time. In the grease-up operation, the electric actuator 23A separated from the coupling housing 320 is operated at an operation stroke (for example, approximately several times of strokes) greater than an operation stroke in a linear operation of the electric actuator 23A when the governing valve 13 is driven. After the grease-up operation is performed at a predetermined operation stroke and a number of times of the operation (Yes in Step S106), the grease-up operation of the electric actuator 23A is stopped (Step S107).

The above-described series of operations are continuously performed until the normal operation state of the steam turbine 10 ends (No in Step S108).

According to the steam turbine 10 of the above-described embodiment, the connection switching section 38 capable of connecting each of the multiple sets of electric actuators 23A and 23B to the lever member 14 individually is provided. Accordingly, for example, in the state where the electric actuator 23A is connected to the lever member 14, it is possible to release the connection of the used electric actuator 23A to the lever member 14 by the connection switching section 38. Accordingly, it is possible to perform maintenance on the used electric actuator 23A.

When the electric actuators 23A and 23B are operated, operation resistance increases due to a decrease of the lubricating oil within a specific range of the ball screw mechanism 27. However, the connections of the used electric actuators 23A and 23B to the lever member 14 are released at an appropriate timing before the electric actuators 23A and 23B reach the limit of the use by measuring at least one of the temperature of the ball screw mechanism 27 (particularly, temperatures of ball screw 30 and nut 311), the drive current, and the vibration, and accordingly, it is possible to perform maintenance on the separated electric actuator.

In addition, since the control is performed while monitoring the number of operation cycles or the operation time, the electric actuators 23A and 23B are switched at fixed intervals, and it is possible to perform maintenance on the electric actuators 23A and 23b in which the connection to the lever member 14 is released. Accordingly, it is possible to perform maintenance of the electric actuators 23A and 23B in a completely automatic manner. As a result, since the maintenance is performed at an appropriate timing, it is possible to increase endurance of the electric actuators 23A and 23B.

In addition, it is possible to automatically perform an operation for maintenance on the electric actuators 23A and 23B in which the connection to the lever member 14 is released. For example, in the operation for maintenance, it is possible to operate the electric actuators 23A and 23B at a greater stroke than the stroke of the linear motion during the normal operations of the electric actuators 23A and 23B. Accordingly, it is possible to improve the grease-up in the ball screw 30.

In addition, in the coupling housing 320, the sensor rod 323 which extends along the actuator side rod 314 is provided. Accordingly, it is possible to detect whether or not the actuator side rod 314 is connected to the coupling housing 320 by detecting the position of the detection element 324. Therefore, only in a case where the actuator side rod 314 is correctly connected to the coupling housing 320, the electric actuator 23 is operated so as to drive the governing valve 13. As a result, in a case where the actuator side rod 314 is not correctly connected to the coupling housing 320, it is possible to cause the electric actuator 23 so as not to be operated.

Moreover, in the portion between the ball screw 30 and the nut 311, the retainer 331 is provided between the balls 330 and 330 adjacent to each other. Accordingly, friction between the balls 330 and 330 adjacent to each other decreases, and it is possible to prevent heat generation during an operation. Therefore, it is possible to increase endurance of the electric actuators 23A and 23B.

The present invention is not limited to the above-described embodiment, and includes various modifications applied to the above-described embodiment within a range which does not depart from the gist of the present invention. That is, specific shapes, configurations, or the like described in the embodiment are only examples, and can be appropriately modified.

For example, the coupling mechanism 32 is exemplified as an example of the connection switching section 38. However, the present invention is not limited to the above configuration as long as it exerts the same function, and other configurations may be adopted.

In addition, the electric actuators 23 are not limited to two sets. For example, three sets or more of electric actuators may be provided.

In addition, the case where the ball screw mechanism 27 includes the retainer 331 between the balls 330 and 330 adjacent to each other is described. However, the ball screw mechanism 27 which does not include the retainer 331 may be used.

In addition, instead of the ball screw mechanism 27, other configurations such as a roller screw mechanism may be adopted.

REFERENCE SIGNS LIST

10: STEAM TURBINE
11: TURBINE MAIN BODY
12: STEAM FLOW PATH
13: GOVERNING VALVE
14: LEVER MEMBER (VALVE BODY ADVANCING/RETREATING MECHANISM)
15: GOVERNING VALVE DRIVE MECHANISM
16: LOCK MECHANISM
17: ELECTRONIC GOVERNOR (CONTROL UNIT)
18: COMPRESSOR
19: LEVER SIDE ROD
20: SPRING
21: BRACKET
22: HOLDING MEMBER
23, 23A, 23B: ELECTRIC ACTUATOR (CONVERSION MECHANISM)
26: ELECTRIC MOTOR (ROTATIONAL DRIVE SOURCE)
27: BALL SCREW MECHANISM
28: BRAKE
30: BALL SCREW (CONVERSION SECTION)
32: COUPLING MECHANISM
34: OPERATION PANEL
35: CONTROLLER UNIT
35A, 35B: CONTROLLER UNIT
38: CONNECTION SWITCHING SECTION
116: BLADE
132: SEALING MEMBER (VALVE BODY)
311: NUT
312: PISTON ROD
313: ROD END CONNECTOR
314: ACTUATOR SIDE ROD
316: ENGAGEMENT KEY SHAFT
316k: ENGAGEMENT KEY
317: DRIVE ARM
318: OSCILLATING MECHANISM
319: ENGAGEMENT RECESSED PORTION
320: COUPLING HOUSING
322: ACTUATOR SIDE ROD INSERTION HOLE
323: SENSOR ROD
324: DETECTION ELEMENT
330: BALL
331: RETAINER
351: CONTROLLER
352: SERVO DRIVE

The invention claimed is:

1. A governing valve drive mechanism driving a governing valve which opens/closes a steam flow path, through which steam serving as a working fluid of a steam turbine circulates, with a valve body in order to regulate a flow rate of the steam, comprising:
   a valve body advancing/retreating mechanism which advances and retreats the valve body toward and from the steam flow path;
   multiple sets of conversion mechanisms in which each set includes a rotational drive source and a conversion section which converts rotation of the rotational drive source into a linear motion;
   a connection switching section by which each set of the multiple sets of conversion mechanisms can be individually connected to the valve body advancing/retreating mechanism; and
   a control unit which controls operations of the rotational drive source and the connection switching section.

2. The governing valve drive mechanism according to claim 1, further comprising,
   a measurement unit which measures at least one of a temperature, a drive current, vibration, the number of operation cycles, and the operation time of each of the conversion sections of the multiple sets of conversion mechanisms,
   wherein the control unit switches the conversion mechanisms which are connected to the valve body advancing/retreating mechanism, based on a measurement result of the measurement unit.

3. The governing valve drive mechanism according to claim 2,
   wherein the control unit performs a preset operation for maintenance on the conversion mechanism, in which connection to the valve body advancing/retreating mechanism is released, using the connection switching section.

4. The governing valve drive mechanism according to claim 2,
   wherein the conversion section is a ball screw mechanism in which a ball screw and a nut are fitted to each other via multiple balls in a circumferential direction by a screw operation,
   wherein a retainer is provided between the balls adjacent to each other in the circumferential direction.

5. A steam turbine, comprising:
   a turbine main body which includes a blade which is rotatably supported;
   a steam flow path which is connected to the turbine main body and through which steam circulates;
   a governing valve which linearly moves and regulates opening/closing of the steam flow path; and
   the governing valve drive mechanism according to claim 2 which drives the governing valve.

6. The governing valve drive mechanism according to claim 1,
   wherein the control unit performs a preset operation for maintenance on the conversion mechanism, in which connection to the valve body advancing/retreating mechanism is released, using the connection switching section.

7. The governing valve drive mechanism according to claim 6,
   wherein the conversion section is a ball screw mechanism in which a ball screw and a nut are fitted to each other via multiple balls in a circumferential direction by a screw operation,
   wherein a retainer is provided between the balls adjacent to each other in the circumferential direction.

8. A steam turbine, comprising:
   a turbine main body which includes a blade which is rotatably supported;
   a steam flow path which is connected to the turbine main body and through which steam circulates;
   a governing valve which linearly moves and regulates opening/closing of the steam flow path; and
   the governing valve drive mechanism according to claim 6 which drives the governing valve.

9. The governing valve drive mechanism according to claim 1,
   wherein the conversion section is a ball screw mechanism in which a ball screw and a nut are fitted to each other via multiple balls in a circumferential direction by a screw operation,
   wherein a retainer is provided between the balls adjacent to each other in the circumferential direction.

10. A steam turbine, comprising:
    a turbine main body which includes a blade which is rotatably supported;
    a steam flow path which is connected to the turbine main body and through which steam circulates;
    a governing valve which linearly moves and regulates opening/closing of the steam flow path; and
    the governing valve drive mechanism according to claim 1 which drives the governing valve.

* * * * *